Oct. 18, 1932.                H. N. SMITH                1,883,025
                   MACHINE FOR CUTTING FRICTION ELEMENTS
                           Filed Oct. 14, 1929
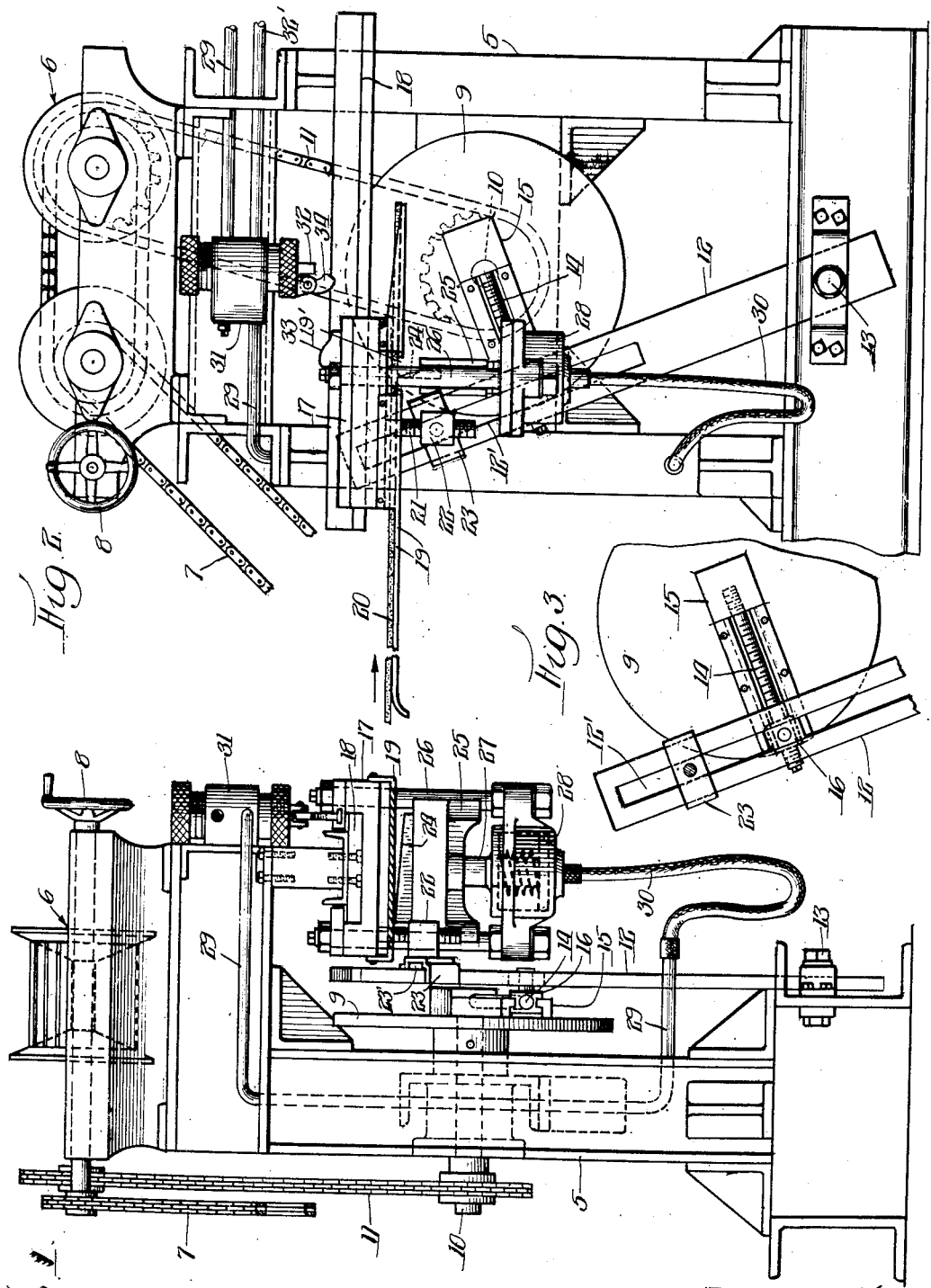
Inventor:
Harry N. Smith
By Wm. O. Belt atty.

Patented Oct. 18, 1932

1,883,025

UNITED STATES PATENT OFFICE

HARRY N. SMITH, OF DETROIT, MICHIGAN, ASSIGNOR TO AMERICAN BRAKE MATERIALS CORPORATION, OF NEW YORK, N. Y., A CORPORATION OF NEW YORK

MACHINE FOR CUTTING FRICTION ELEMENTS

Application filed October 14, 1929. Serial No. 399,530.

This invention relates to machines for making composition friction elements like, for example, that described in the application of William A. Blume, Serial No. 396,936, filed October 2, 1929, and for use in connection with a strip forming machine such as that described in my companion application Serial No. 402,100, filed October 24, 1929.

The primary object of the invention is to provide a novel machine of simple construction for automatically cutting the continuous strip as it comes from the strip forming machine into liners or blocks of predetermined lengths.

Another object of the invention is to provide novel and simple means for timing the movement of the carriage with relation to the movement of the strip to arrange the strip on the carriage in position for cutting a predetermined length from the strip at each operation of the carriage.

And another object of the invention is to provide novel means for synchronizing the travel of the carriage with the feed of the material so that the cutting operation may be performed while the material and carriage are traveling at the same rate of speed.

In the accompanying drawing illustrating a selected embodiment of the invention

Fig. 1 is a front elevation of the machine with a part thereof shown in section.

Fig. 2 is a right side elevation of the machine as it appears in Fig. 1.

Fig. 3 is a detail view partly in section.

Referring to the drawing 5 is a suitable frame having thereon a variable speed transmission 6 which is provided with a chain drive 7 connected with the strip forming machine or other source of power. This transmission is provided with an adjusting device 8 whereby the cutting mechanism may be properly timed with respect to the delivery of material to the cutting machine to sever the material at predetermined intervals into liners or blocks of desired lengths. A disk 9 is mounted on a shaft 10 in the frame and is driven from the transmission by a sprocket chain 11. A rocker arm 12 is pivoted at 13 on the frame and is provided with a slot 12' in its upper portion. A screw 14 is mounted radially on the disk 9 in a bracket 15 carried by the disk and this screw operates in a block 16 which is slidable in the slot 12' of the rocker arm. A carriage 17 is slidably mounted on a guide 18 supported in the frame and this carriage carries a shelf 19 which receives the strip of material 20 from the forming machine and supports it during the cutting operation. A bolt 21 rigid with the carriage projects downward therefrom and threadedly engages a block 22 which is pivotally mounted on a bracket 23 which slidably engages the rocker arm 12. This bracket projects across one side of the rocker arm and embraces the edges thereof and it is shaped at 23' to clear a part of the block 16 which projects through the slot 12' in the rocker arm, Fig. 1. A cutter 24 is mounted on a cutter head 25 which is guided between bolts 26 and is operated by a piston 27 mounted in a pressure cylinder 28. A pressure line 29 is connected by a flexible hose 30 with the cylinder 28 and it is provided with a valve designated generally 31 having an operating plunger 32. A cam 33 on the carriage is positioned to engage the trigger 34 suspended from the valve on the forward movement of the carriage to operate the plunger and its valve and admit pressure to the cylinder 28 for operating the cutter 24, the shelf 19 having an opening 19' to receive the knife. The shelf is suspended from the carriage and is spaced therefrom to receive the material strip 20 which is held between the shelf and the carriage during the cutting operation. The length of the liner or block to be cut from the strip is determined by adjusting the variable speed transmission with respect to the delivery of the material strip to the cutting machine, and the speed of travel of the carriage is synchronized with the speed of travel of the material strip by adjusting the rocking limits of the rocker arm 12 through the screw bolt 14 so that the cutting operation will take place while the material strip and the carriage are traveling at the same rate of speed and the material strip is at rest on the carriage shelf. By the time the cam has passed the tripper 34 the cutter has operated and the tripper swings down to idle position permitting the plunger 32 and its valve to return to normal position closing the intake line 29 and opening the exhaust line 32' whereupon the cutter and its piston return to normal lowered position. On the return movement of the carriage to the left, Fig. 2, the tripper is swung idly by the cam.

In practice the material strip 20 will be received from the forming machine or other source at a given rate of speed and the variable speed transmission will be adjusted to time the speed of revolution of the disk 9 to operate the carriage for cutting predetermined lengths from the strip. The material strip is under constant forward feed and as the carriage returns to its initial position, to the left Fig. 2, the strip will feed forward of the cutter as much as the predetermined length of strip to be cut. This is determined by the adjustment of the variable speed transmission to time the movement of the carriage with respect to the movement of the material strip. On the forward travel of the carriage to the right, Fig. 2, the material strip and carriage will travel together but the carriage will travel at varying rates of speed relative to the material strip, and the block 16 is adjusted towards or from the center of disk 9 to synchronize the speed of travel of the carriage with the speed of travel of the strip so that when the block 16 is passing the vertical center line through the shaft 10 the strip and the carriage will be traveling at the same rate of speed; and it is at this point that the cutter is operated to sever the strip while the strip and carriage are traveling at the same rate of speed.

My invention provides a machine of simple construction which is adapted to receive the material strip from and as it is formed in the strip forming machine and to cut it into predetermined lengths. If the material is thick it may be cut into relatively short blocks, if it is thin it may be cut into liner strips of any length within the capacity of the machine, but any material may be cut into any lengths by making the required adjustments. The material may be delivered to the cutting machine by hand from stock or from any other machine than that herein referred to, or from any other source, and the variable speed transmission provides a simple means for adjusting the cutting machine to the delivery of the material thereto.

I have shown the invention in an embodiment which has been found satisfactory in practical use but I do not restrict the invention to this particular embodiment but reserve the right to make all such changes in the form, construction and arrangement of parts as fall within the scope of the following claims:

I claim:

1. A machine for cutting into predetermined lengths strip material under constant feed to the machine and comprising a carriage to receive and carry the material, means for reciprocating the carriage, cutter devices movable with the carriage, pneumatic means for operating the cutter devices, means actuated by the carriage for controlling operation of the pneumatic means, and means for timing the movement of the carriage with relation to the movement of the strip to arrange the strip on the carriage in position for cutting a predetermined length from the strip at each operation of the carriage.

2. A machine for cutting into predetermined lengths strip material under constant feed to the machine and comprising a carriage to receive and carry the material, means for reciprocating the carriage, cutter devices movable conjointly with and relatively to the carriage, means mounted on the carriage for movement therewith for operating said cutter devices, means operated by the carriage for automatically controlling operation of said cutter devices, and means for timing the movement of the carriage with relation to the movement of the strip to arrange the strip on the carriage in position for cutting a predetermined length from the strip at each operation of the carriage.

3. A machine for cutting into predetermined lengths strip material under constant feed to the machine and comprising a carriage to receive and carry the material, means for reciprocating the carriage, cutter devices, pneumatic means for operating said cutter devices, means actuated by the carriage for automatically controlling operation of said cutter devices operating means and means for synchronizing the travel of the carriage with the feed of the material.

4. A machine for cutting into predetermined lengths strip material under constant feed to the machine and comprising a carriage to receive and carry the material, means for reciprocating the carriage, cutter devices on the carriage, pneumatic means on the carriage for operating said cutter devices, means actuated by the carriage for automatically controlling operation of said pneumatic means, and means for synchronizing the travel of the carriage with the feed of the material.

5. A machine for cutting into predetermined lengths strip material under constant feed to the machine and comprising a carriage, a shelf on the carriage to receive and support the material, means for reciprocating the carriage, cutter devices on the carriage below the shelf, said shelf having an opening to permit the cutter to operate therethrough, pneumatic means for operating the cutter, a valve for controlling operation of the cutter, a trigger for controlling said valve and operable from the carriage, and means for timing the movement of the carriage with relation to movement of the strip to arrange the strip on the carriage in position for cutting a predetermined length from the strip at each operation of the carriage.

HARRY N. SMITH.